United States Patent
Balasingh et al.

(10) Patent No.: US 10,050,930 B2
(45) Date of Patent: Aug. 14, 2018

(54) MULTI-RADIO SINGLE INTERNET PROTOCOL ADDRESS WIRELESS LOCAL AREA NETWORK APPARATUS AND METHOD

(71) Applicant: Motorola Mobility LLC, Chicago, IL (US)

(72) Inventors: Binesh Balasingh, Naperville, IL (US); Ranjeet Gupta, Chicago, IL (US); Mary Hor-Lao, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 120 days.

(21) Appl. No.: 15/219,240

(22) Filed: Jul. 25, 2016

(65) Prior Publication Data

US 2017/0289097 A1    Oct. 5, 2017

Related U.S. Application Data

(60) Provisional application No. 62/316,563, filed on Mar. 31, 2016.

(51) Int. Cl.
*H04L 29/12* (2006.01)
*H04W 72/04* (2009.01)
*H04W 88/08* (2009.01)
*H04W 84/12* (2009.01)

(52) U.S. Cl.
CPC .......... *H04L 61/2007* (2013.01); *H04L 61/10* (2013.01); *H04W 72/04* (2013.01); *H04W 84/12* (2013.01); *H04W 88/08* (2013.01)

(58) Field of Classification Search
CPC .... H04L 61/2007; H04L 61/10; H04W 72/04; H04W 84/12; H04W 88/08
See application file for complete search history.

(56) References Cited

U.S. PATENT DOCUMENTS

| | | | |
|---|---|---|---|
| 2011/0004913 A1* | 1/2011 | Nagarajan | H04L 63/102 726/1 |
| 2014/0325615 A1* | 10/2014 | Scahill | H04L 63/1425 726/4 |
| 2015/0181514 A1* | 6/2015 | Belghoul | H04W 72/1215 370/254 |
| 2015/0189567 A1* | 7/2015 | Srivastava | H04W 36/30 370/332 |
| 2015/0264571 A1* | 9/2015 | Filippi | H04L 63/0272 726/4 |
| 2016/0234672 A1* | 8/2016 | Cho | H04W 24/02 |
| 2016/0323089 A1* | 11/2016 | Hirsch | H04W 72/0446 |
| 2016/0330756 A1* | 11/2016 | Sun | H04W 72/1226 |
| 2017/0093704 A1* | 3/2017 | Cui | H04L 45/70 |

* cited by examiner

*Primary Examiner* — Brian D Nguyen
(74) *Attorney, Agent, or Firm* — Cygan Law Offices P.C.; Joseph T. Cygan

(57) ABSTRACT

An apparatus includes a first media access control (MAC) device with a first radio transceiver and having a first MAC address, and a second MAC device with a second radio transceiver and having a second MAC address. The first MAC device is operative to communicate with a first wireless access point using an Internet Protocol (IP) address. The second MAC device is operatively coupled to the first MAC device, and is operative to communicate with a second wireless access point using the same IP address.

15 Claims, 8 Drawing Sheets

- PRIOR ART - ly to U.S. Provisional
MULTI-RADIO SINGLE INTERNET PROTOCOL ADDRESS WIRELESS LOCAL AREA NETWORK APPARATUS AND METHOD

CROSS-REFERENCE TO RELATED APPLICATIONS

The present application claims priority to U.S. Provisional Patent Application No. 62/316,563, filed Mar. 31, 2016, entitled "MULTI-RADIO, SINGLE INTERNET PROTOCOL ADDRESS WIRELESS LOCAL AREA NETWORK APPARATUS AND METHOD" which is hereby incorporated by reference herein in its entirety, and which is assigned to the same assignee as the present application.

FIELD OF THE DISCLOSURE

The present disclosure relates generally to wireless device communication using wireless local area network access points and more particularly to multi-radio wireless devices in communication with wireless local area network access points.

BACKGROUND

The mobile phone industry is moving rapidly toward providing hardware upgradability for mobile device components. One likely upgrade may involve adding a second Wi-Fi® radio, or more, to improve wireless local area network (WLAN) connectivity and provide better performance. Adding a second, or even multiple, WLAN integrated circuits (ICs) to create parallel data paths for the mobile device creates challenges in that independent radios must contend for the same medium at the Media Access Control (MAC) Layer and at the physical (PHY) layer.

An example known multiple radio system 100 is shown in FIG. 1. The multiple radio system 100 includes a processor 101 with a first network interface 102 that uses a first MAC address and a second network interface 105 that uses a second MAC address. The network interfaces are software access points to the processor 101. A first radio system, WLAN subsystem 104, includes WLAN hardware, a WLAN subsystem 1 driver and interfaces with an antenna system. A second radio system, WLAN subsystem 107, also includes WLAN hardware, a WLAN subsystem 2 driver and may interface with the same antenna system as first radio system, or may have a separate antenna system. In either case, the first WLAN subsystem 104 MAC Layer sends data transmissions 103 and also receives data via the network interface 102. The second radio system, WLAN subsystem 107 MAC layer similarly sends data transmissions 106 and also receives data via the network interface 105. The data transmissions 103 and data transmissions 106 are in contention at the MAC Layer and at the PHY layer in the wireless medium access, based on the backoff algorithm. Furthermore, each radio system uses a separate Internet Protocol address to communicate with a WLAN.

DETAILED DESCRIPTION

Figure 1:
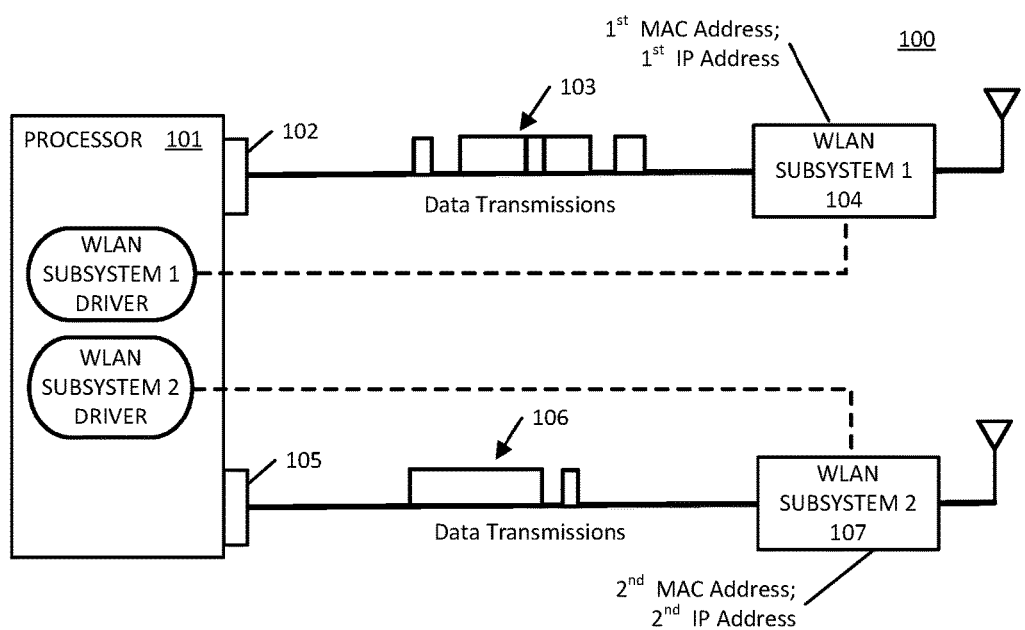
FIG. 1 is a block diagram of a known dual radio system for wireless local area network access with the two radio systems being in contention.

Briefly, the disclosed embodiments provide apparatuses and methods of operation that enable cooperative utilization of two or more wireless local area network (WLAN) subsystems, also referred to herein as MAC devices, each having its own distinct MAC address, but using a single Internet Protocol (IP) address, in a wireless device such as mobile phone (i.e. smartphone), a laptop computer, desktop computer, tablet, etc. The disclosed embodiments determine if two or more MAC devices are communicating with access points (APs) within the same Extended Service Set (ESS) and enable cooperation between the various MAC devices for radio transmission using the common ESS. The operations implemented in accordance with the embodiments comply with IEEE 802.11 requirements for WLAN communication.

One aspect of the present disclosure is an apparatus that includes a first media access control (MAC) device with a first radio transceiver and having a first MAC address, and a second MAC device with a second radio transceiver and having a second MAC address. The first MAC device is operative to communicate with a first wireless access point using an Internet Protocol (IP) address. The second MAC device is operatively coupled to the first MAC device, and is operative to communicate with a second wireless access point using the same IP address. In one embodiment, the apparatus includes MAC manager logic that is operatively coupled to the first MAC device and to the second MAC device. The MAC manager logic is operative, among other things, to determine that the first wireless access point and the second wireless access point are in a common ESS (Extended Service Set). The MAC manager logic is further operative to control the first MAC device and the second MAC device to use the same IP address in response to determining that the first wireless access point and the second wireless access point are in a common ESS.

Some embodiments may include a processor that is operatively coupled to the MAC manager logic, and that is operative to maintain a network data queue. The MAC manager logic is further operative to allocate data from the network data queue to the first MAC device and the second MAC device to coordinate communication with the first access point and the second access point using the same IP address.

In some embodiments, the MAC manager logic may determine that the first wireless access point and the second wireless access point are in a common ESS by using an address resolution request. The MAC manager logic is operative to control the second MAC device to send the address resolution request to the second wireless access point for an IP address assigned to the first MAC device, and determine that the first wireless access point and the second access point are in the same ESS in response to an address resolution request response being received by the first MAC device.

Also the MAC manager logic is operative to determine that the first wireless access point and the second access point are in a different ESS in response to an address resolution response for the IP address assigned to the first MAC device being received by the second MAC device, and to search for a third wireless access point within the same ESS as the first wireless access point.

In some embodiments, the MAC manager logic is also operative to determine a set of wireless access points within a common ESS using the first MAC device and the second MAC device, and select a first wireless access point for association with the first MAC device and a second wireless access point for association with the second MAC device based on at least one of supported data rate or congestion criteria for each of the wireless access points.

In one embodiment, the MAC manager logic is an application specific integrated circuit (ASIC). In another embodiment, the MAC manager logic includes a field programmable gate array (FPGA).

Another aspect of the present disclosure is a method that includes: determining that a first wireless access point and a second wireless access point are in a common ESS; associating a first MAC device having a first MAC address with the first wireless access point and obtaining an IP address; and associating a second MAC device having a second MAC address with the second wireless access point using the same IP address in response to determining that the first wireless access point and the second wireless access point are in the same ESS.

In some embodiments, the method may further include allocating data from a single network data queue to the first MAC device and the second MAC device to coordinate communication with the first wireless access point and the second wireless access point using the same IP address. In some embodiments, the method includes determining that the first wireless access point and the second wireless access point are in a common ESS using an address resolution request.

The method may include controlling the second MAC device to send the address resolution request to the second wireless access point for an IP address assigned to the first MAC device, and determining that the first wireless access point and the second access point are in the same ESS in response to an address resolution request response being received by the first MAC device. The method may include determining that the first wireless access point and the second access point are in a different ESS in response to an address resolution response for the IP address assigned to the first MAC device being received by the second MAC device, and searching for a third wireless access point within the same ESS as the first wireless access point.

In some embodiments, the method may include determining a set of wireless access points within a common ESS using the first MAC device and the second MAC device, and selecting a first wireless access point for association with the first MAC device and a second wireless access point for association with the second MAC device based on at least one of supported data rate or congestion criteria for each of the wireless access points.

Figure 2:
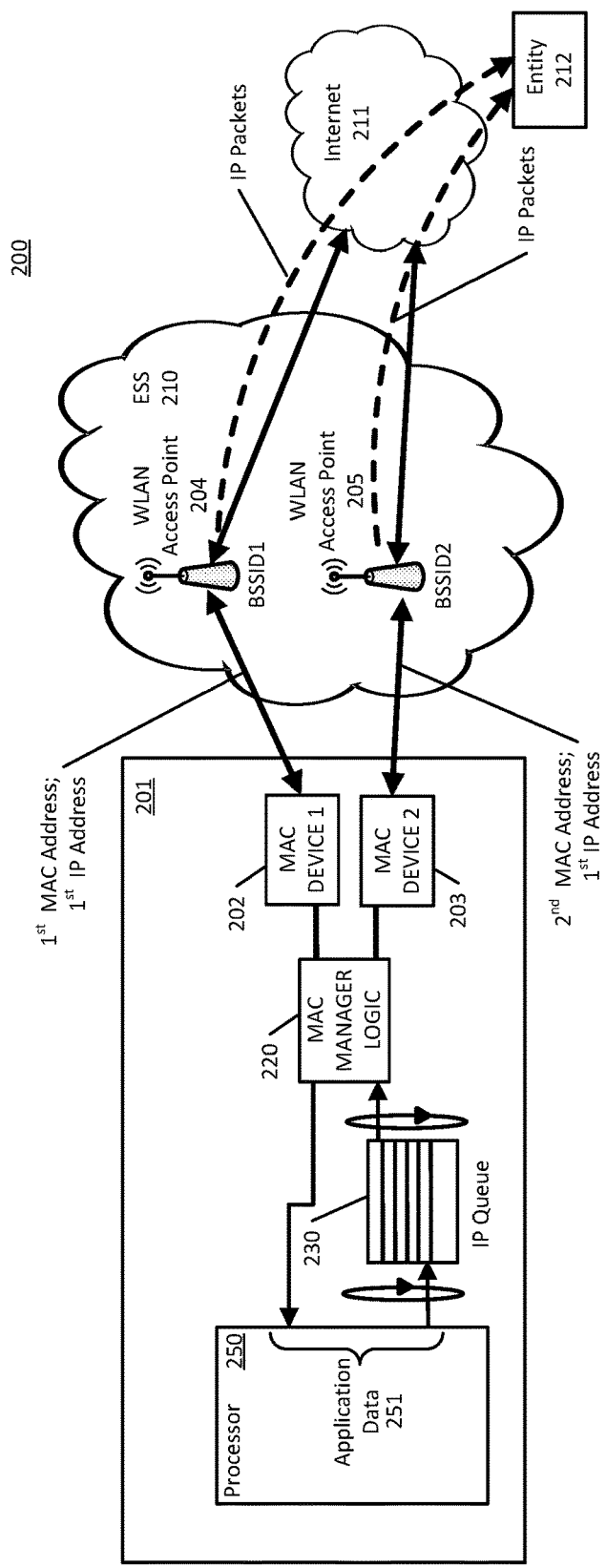
FIG. 2 is a diagram of an apparatus with dual radios using a single IP address to communicate with a common ESS in accordance with an embodiment.

Turning now to FIG. 2, a diagram is provided showing an apparatus 201 that has dual radios and that uses a single IP address to communicate with a common ESS (Extended Service Set) 210 in wireless local area network (WLAN) 200. The apparatus 201 may be a device such as, but not limited to, a mobile phone (i.e. smartphone), a laptop computer, desktop computer, tablet, etc. The apparatus 201 includes a first MAC device 202 and a second MAC device 203, each having its own distinct MAC address.

The term "MAC device" as used herein refers to a WLAN subsystem that includes a WLAN chipset having a radio transmitter and radio receiver (collectively "radio transceiver") and that has a corresponding MAC address and any related MAC layer capability. Some MAC layer capability may be implemented outside of the WLAN chipset in some embodiments, for example, by a WLAN subsystem driver executing on another processor and/or other WLAN related software and/or firmware etc. This external MAC layer software or firmware such as, but not limited to, the WLAN subsystem driver, is considered part of a "WLAN subsystem" and therefore part of a "MAC device" as these terms are used herein. The terms "radio," "radio transmitter," "radio transceiver," and/or "radio receiver" are used interchangeably herein to refer to IEEE 802 compliant hardware, such as the physical layer (PHY layer) capability provided by a WLAN chipset. As such, the apparatus 201 shown in FIG. 2 may be considered to include two MAC devices (or two WLAN subsystems), a first MAC device 202 and a second MAC device 203, as the terms are used herein. Each MAC device may be implemented as a chipset in some embodiment, including any required software or firmware such as, but not limited to, drivers executing on the processor 250.

Each MAC device may establish an IP connection with a WLAN access point (AP) in the ESS 210. In the example of FIG. 2, the first MAC device 202, which has a first MAC address, establishes a first IP connection with a first WLAN AP 204 corresponding to BSSID1 (Base Station Service Set 1). The second MAC device 203, which has a second MAC address, establishes a second IP connection with a second WLAN AP 205 corresponding to BSSID2. Both the first WLAN AP 204 and the second WLAN AP 205 are connected to the Internet 211 via a backhaul network (not shown). In accordance with the embodiments, the first MAC device 202 and the second MAC device 203 communicate with the WLAN ESS 210 using the same IP address.

Figure 3:
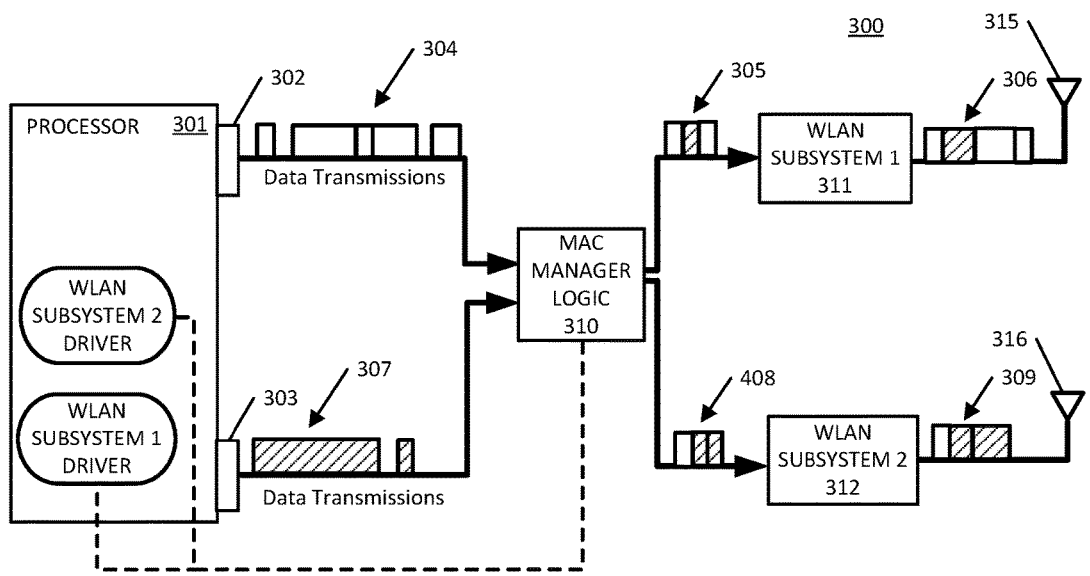
FIG. 3 is a block diagram of a dual radio system having two network interfaces to a processor in accordance with an embodiment.

In FIG. 3, a block diagram of a dual radio system 300 is shown having two network interfaces 302, 303 to a processor 301 in accordance with an embodiment. The dual radio system 300 may be incorporated into a device such as, but not limited to, a mobile phone (i.e. smartphone), a laptop computer, desktop computer, tablet, etc. A first WLAN subsystem 311 is operatively coupled to one or more antennas 315 and includes a first WLAN subsystem driver. A second WLAN subsystem 312 is operatively coupled to one or more antennas 316 and includes a second WLAN subsystem driver. The first and second WLAN subsystem drivers may be executed by the processor 301. The processor 301 implements a first network interface 302 that uses a first MAC address and a second network interface 303 that uses a second MAC address for the first WLAN subsystem 311 and second WLAN subsystem 312, respectively. "MAC manager logic" 310 is operatively coupled to network interface 302 and network interface 303, and is operative to communicate with, and control, first WLAN subsystem 311 driver and the second WLAN subsystem 312 driver.

The MAC manager logic 310 is operative to control multiple MAC layers that are available for the dual radio system 300 to transmit data. Although the example embodiment of FIG. 3 shows two network interfaces and therefore two MAC addresses and two radios (i.e. two WLAN subsystems), the embodiments are not limited to two radios and therefore multiple radios and multiple MAC addresses may be used in various embodiments. In the example dual radio system 300, network interface 302 corresponding to a first MAC address may send first MAC layer data 304 to the MAC manager logic 310 while network interface 303 corresponding to a second MAC address sends second MAC layer data 307 to the MAC manager logic 310. The MAC manager logic 310 is operative to make decisions as to how first MAC layer data 304 and second MAC layer data 307 is allocated for transmission by the first radio transmitter 315 and the second radio transmitter 316. As shown in the example of FIG. 3, the MAC manager logic 310 can provide data 305 to the first WLAN subsystem 311 and data 308 to the second WLAN subsystem 312. The data 305 and data 308 include reallocated portions of first MAC layer data 304 and second MAC layer data 307. Therefore the first WLAN subsystem 311 will transmit data 306 which includes portions of first MAC layer data 304 from the first MAC address and portions of second MAC layer data 307 from the second MAC address. Likewise the second WLAN subsystem 312 will transmit data 309 which also includes portions of first MAC layer data 304 from the first MAC address and portions of second MAC layer data 307 from the second MAC address.

Figure 4:
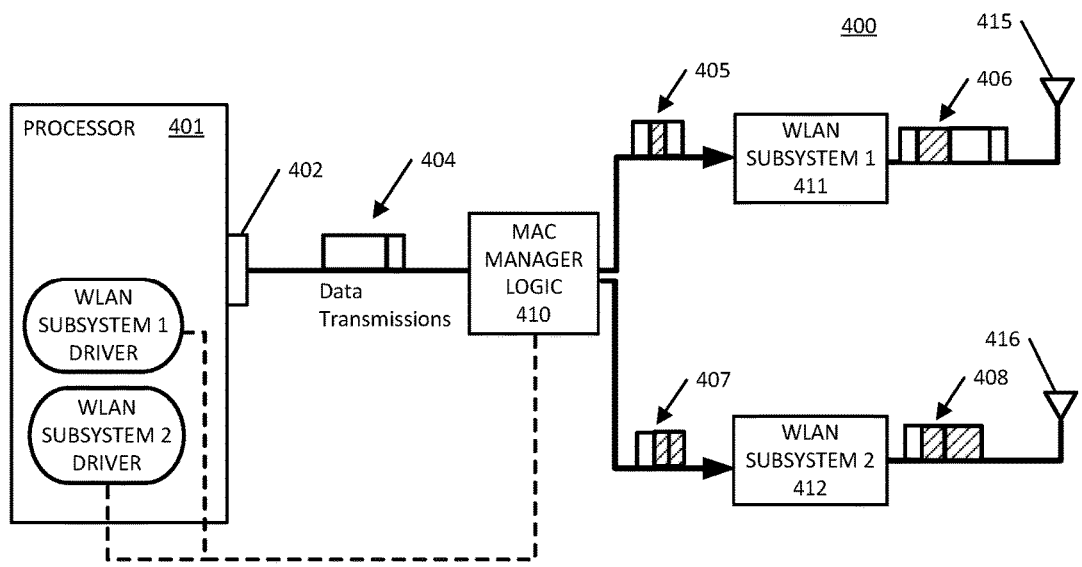
FIG. 4 is a block diagram of a dual radio system having a single network interface to a processor in accordance with an embodiment.

The MAC manager logic may also operate on a single network interface based system such as the dual radio system 400 depicted in FIG. 4. In the dual radio system 400, a processor 401 has a single network interface 402 that is operative to send data corresponding to either the first MAC address or the second MAC address in accordance with an embodiment. The dual radio system 400 may be incorporated into a device such as, but not limited to, a mobile phone (i.e. smartphone), a laptop computer, desktop computer, tablet, etc. A first WLAN subsystem 411 is operatively coupled to one or more antennas 415 and includes a first WLAN subsystem driver 411. A second WLAN subsystem 412 is operatively coupled to one or more antennas 416 and includes a second WLAN subsystem driver. The first and second WLAN subsystem drivers may be executed by a processor 401. "MAC manager logic" 410 is operatively coupled to the network interface 402, and is operative to communicate with, and control, the first WLAN subsystem 411 driver and the second WLAN subsystem 412 driver.

In the example dual radio system 400, network interface 402 may send data 404 to the MAC manager logic 410 which is operative to make decisions as to how data 404 is allocated for transmission by the first WLAN subsystem 411 and the second WLAN subsystem 412. In other words, the MAC manager logic 410 is operative to determine which MAC device (i.e. WLAN subsystem) is used to transmit data and can combine data for both layers and route that data to either of the WLAN subsystem radio transmitters. For example, if the data 404 includes first MAC layer data, then the MAC manager logic 410 may partition the data 404 and combine it with data for the second MAC layer. As shown in the example of FIG. 4, the MAC manager logic 410 can provide data 405 to the first WLAN subsystem 411 and data 407 to the second WLAN subsystem 412. The data 405 and data 407 include portions of data 404 selected for transmission according to radio selection procedures of the embodiments. Therefore the first WLAN subsystem 411 radio transmitter will transmit data 406 and the second WLAN subsystem 412 radio transmitter will transmit data 408, where the data includes portions of data 404 reallocated using radio selection procedures.

In the examples of FIG. 3 and FIG. 4, the radio selection procedures implemented by the MAC manager logic use information from the WLAN subsystem radio transmitters along with information obtained from the WLAN subsystem MAC layers. The MAC manager logic receives, and is functionally aware of the MAC layer information of each of the attached physical/virtual MAC modules. More particularly, the MAC manager logic receives information and is aware of the following for each MAC attached: current MAC state (i.e. associated/authenticated/connected/disconnected); TSF (Timing Synchronization Function) sync information; PER (Packet Error Rate) and BER (Bit Error Rate) statistics; BSSID (basic service set identification) which is the MAC address of the wireless AP; RSSI (Received Signal Strength Indicator) to any connected BSSID; associated channel statistics; Tx MCS (Modulation and Coding Scheme) index; Current Contention Window; CCA (clear channel assessment) reports; Tx/Rx state; control frame distribution; PTK (Pairwise Transient Key) and GTK (Group Temporal Key); and MAC address. Further, the MAC manager logic is operative to control the following characteristics of each attached MAC: Tx Data; Tx instant; NAV request size; clock sync within TU (Time Unit; specified in 802.11 as 1024 μs) precision; the encryption key to be used for a current data frame; and the MAC address to be used for current data frame.

Regarding parallel radio transmission overhead, when the WLAN subsystem radios compete for airtime, the RTS/CTS mechanism is commonly employed to overcome the hidden node problem. The MAC manager logic is operative to control timing between the first and second radio transceivers to transmit data from corresponding first and second MAC layers. The MAC manager logic controls these operations in both the example dual radio system 300 depicted in FIG. 3 or the example dual radio system 400 depicted in FIG. 4. Data transmission to a WLAN may be accomplished using either one of the radios on a single channel and having either a common BSS (basic service set) or different BSS. Put another way, the first and second WLAN subsystem radio transmitters may be connected to the same or different APs. For example, if the first WLAN subsystem 311 radio transmitter in FIG. 3 is transmitting data, then the MAC manager logic may perform a data transfer from the second WLAN subsystem 312 radio transmitter. More particularly, the first WLAN subsystem 311 radio transmitter may transmit data from the first MAC layer and from the second MAC layer. The MAC manager logic also performs a radio selection procedure in order to decide when the first WLAN subsystem radio transmitter or the second WLAN subsystem radio transmitter will be used to transmit.

For example, after selecting the first WLAN subsystem 311 radio transmitter for transmission, the MAC manager logic may send the WLAN subsystem 311 the data buffer of the second WLAN subsystem 312 MAC layer. In response, the first WLAN subsystem 311 will then perform an NAV request (beginning with an RTS) for the total duration required to transmit the first WLAN subsystem 311 data and the second WLAN subsystem 312 data (i.e. for both the first MAC layer data and second MAC layer data). Upon receiving the CTS, the first WLAN subsystem 311 transmits data packets for itself and also on behalf of the second WLAN subsystem 312.

By performing the example MAC manager logic data transfer operation described above, the second WLAN subsystem 312 data transmission is scheduled earlier than would have been in the prior system example shown in FIG. 1, by a time duration equal to the DIFS duration, plus twice the SIFS duration, plus the Random Backoff time. Therefore, as long as the time required to send the data from both a first radio transmitter and a second radio transmitter combined is less than $2^{16}$ TUs, then a single RTS/CTS request can suffice to perform the required NAV reservation. In situations with larger data requirements where an additional NAV Request is required, the MAC manager logic will perform the radio transmitter selection procedure again to select which WLAN subsystem radio transmitter will send data during the transmission interval. In other words, the first WLAN subsystem radio transmitter or the second WLAN subsystem radio transmitter may be selected to transmit for the second NAV interval.

For systems not utilizing RTS/CTS, two transmitters contending for a medium are also managed by the MAC manager logic. Such operations may be implemented by the example dual radio system 300 depicted in FIG. 3 or the example dual radio system 400 depicted in FIG. 4. Data transmission may be accomplished using either one of the radios on a single channel and having either a common AP or different APs. For purposes of example referring to FIG. 3, the first WLAN subsystem 311 radio transmitter is assumed to be transmitting data. In operation, the MAC manager logic 310 may perform a data transfer from the second WLAN subsystem 312 radio transmitter to the first WLAN subsystem 311 radio transmitter. The MAC manager logic 310 can make the decision of which WLAN subsystem radio transmitter should be used for the data transmission following the same radio selection procedure as in the RTS/CTS scenario. In other words, the data from the first MAC layer of from the second MAC layer may be sent by either WLAN subsystem radio transmitter if that radio transmitter was better suited to perform the transmission based on radio frequency (RF) conditions and other considerations used by the MAC manager logic 310 to select radios. Additionally, a WLAN subsystem radio transmitter may be preferred during the selection procedure based on its A-MSDU (Aggregate MAC Service Data Unit) capability. An A-MSDU enables multiple MSDUs to be concatenated in a single MPDU (MAC Protocol Data Unit).

In other scenarios, the MAC manager logic may utilize both WLAN subsystem radios to accomplish data transmission. For example referring to FIG. 3, the MAC manager logic 310 may obtain an anticipated NAV time request from the second WLAN subsystem 312 radio transmitter and control the first WLAN subsystem 311 radio transmitter such that the first WLAN subsystem 311 radio transmitter sends a NAV request RTS for the duration required to transmit data from both the first WLAN subsystem 311 radio transmitter and the second WLAN subsystem 312 radio transmitter. After the first WLAN subsystem 311 radio transmitter receives the CTS, the MAC manager logic 310 informs the second WLAN subsystem 312 radio transmitter of the NAV interval (i.e. "start-of-NAV" and end-of-NAV') that can be used by the second WLAN subsystem 312 radio transmitter for data transmission. All control operations performed by the MAC manager logic 310 are implemented by communicating with the network interfaces 302, 303 to the processor 301 and with the WLAN subsystem drivers for each WLAN subsystem radio transmitter.

Regarding the NAV interval, in some situations if the start-of-NAV conveyed to the second radio transmitter equals the end-of-NAV (i.e. end of the overall NAV requested by the first radio transmitter), then this implies that the first radio transmitter is still busy transmitting and has no bandwidth to accommodate the dynamic request from the second radio transmitter. In those situations, transmission by the second radio transmitter is postponed until the next cycle. In situations, where the NAV interval is insufficient for transmission of the second radio transmitter data, then the second radio transmitter data will be split into two data segments, such that a first data segment can be transmitted within the NAV requested by the first radio transmitter. The second data segment can then be scheduled for transmission during the next cycle. This scheduling is handled by the MAC manager logic 310 (or MAC manager logic 410 in the embodiment shown in FIG. 4).

In situations where the NAV interval is sufficient for transmission of the second radio transmitter data, then the second radio transmitter will transmit right after the first radio transmitter has completed its data transmission. By performing these operations of sending the NAV requirement for the second radio transmitter to the first radio transmitter to make the NAV request, the second radio transmitter is scheduled earlier than would be the case in the example of FIG. 1 by a period of time equal to the DIFS duration, plus twice the SIFS duration, plus the Random Backoff time.

In another example, the MAC manager logic 310 may perform a transmission control operation using the first WLAN subsystem 311 radio transmitter and the second WLAN subsystem 312 radio transmitter, but without using the RTS/CTS mechanism. In such an example scenario, the MAC manager logic 310 may send the first WLAN subsystem 311 radio transmitter the data buffer of the second WLAN subsystem 312 radio transmitter. The MAC manager logic 310 schedules the second WLAN subsystem 312 radio transmitter data for transmission immediately after the first WLAN subsystem 311 radio transmitter data transmission is completed. Thus the second WLAN subsystem 312 transmits its own data rather than deferring that task to the first WLAN subsystem 311. Handling of an A-MSDU transmission is the same as described in previous examples above. The second WLAN subsystem 312 scheduled transmission time is also reduced in delay similar to that described in the examples above, with the difference being that the second WLAN subsystem 312 transmits its own data.

Figure 5:
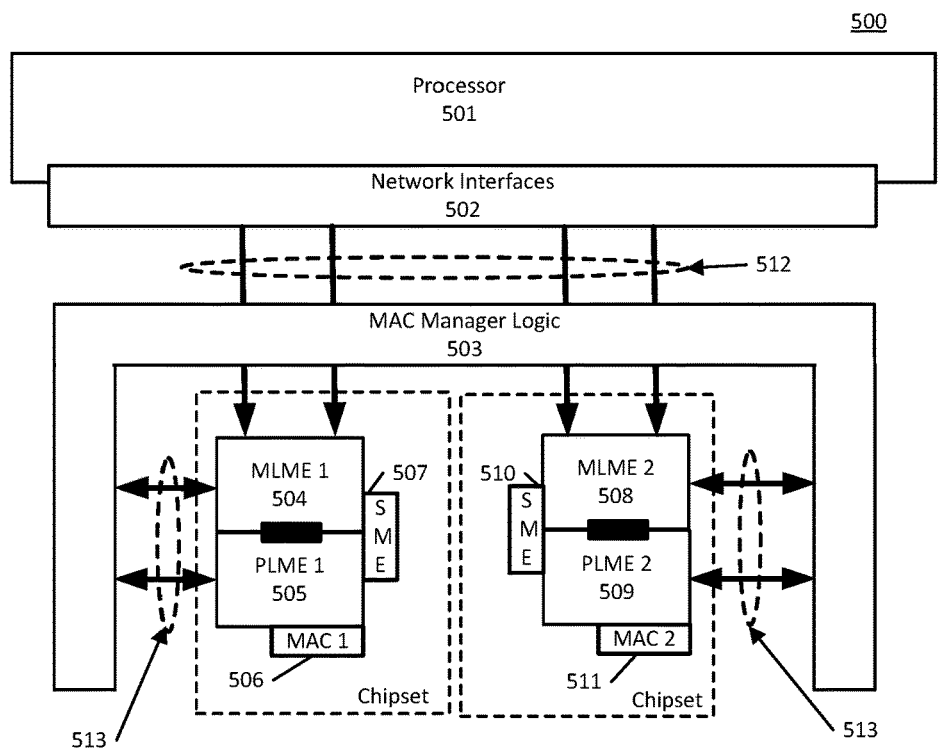
FIG. 5 is a block diagram of a dual radio system implementation in accordance with various embodiments.

A block diagram of an example apparatus 500 incorporating MAC manager logic 503 in accordance with an embodiment is shown in FIG. 5. The example apparatus 500 supports multiple MAC devices (or i.e. multiple WLAN subsystems) and the MAC manager logic 503 is operative to prioritize associated MSDU Data Frames across the multiple MAC devices. Because the apparatus 500 supports two MAC "sublayers," where each MAC sublayer must comply with IEEE 802.11 wireless standards, each MAC device will have independent MLME (MAC sublayer management entity) and PLME (physical layer management entity) components. Because the two (or more) MAC sublayer components are collocated on the same apparatus, the MAC manager logic is placed to leverage the two MAC devices to best utilize the accessibility of the wireless medium. In the example apparatus 500, a processor 501 provides network interfaces 502 which provide communication to the MAC manager logic 503 and provide the MAC manager logic 503 MAC layer information over an interface 512. The processor 501 may also execute the MAC device drivers. The example apparatus 500 may therefore be considered to include two MAC devices (or two WLAN subsystems) as the terms are used herein. Each MAC device may be implemented as a chipset in some embodiments as indicated by the dotted lines in FIG. 5, and may include any required software and/or firmware such as, but not limited to, drivers which may be executed by processor 501.

The MAC devices each include an MLME 504, 508 and an operatively coupled PLME 505, 509. The first MAC device and second MAC device include an SME (station management entity) 507 and SME 510, respectively and a first MAC address 506 and second MAC address 511, respectively. The MLME 504, PLME 505, MLME 508 and PLME 509 are operatively coupled to the MAC manager logic 503 to send and receive information over an interface 513. The interface 512 and interface 513 may be an S-Link™ interface in some embodiments.

The MAC manager logic 503 may be implemented in various ways in the embodiments. For example, in one example embodiment, the MAC manager logic 503 may be implemented as executable instructions executed by one or more processors such as processor 501 or a separate processor that is operatively coupled to the processor 501. In other embodiments, the MAC manager logic 503 may be implemented as hardware or as a combination of hardware and software/firmware. In embodiments implemented as software, or partially in software/firmware, the executable instructions may be stored in operatively coupled, non-volatile, non-transitory memory (not shown), that may be accessed by the one or more processors, such as processor 501, as needed. The memory may be operatively coupled to the one or more processors, may be integrated therewith, or may be some combination of operatively coupled memory and integrated memory.

It is therefore to be understood that the MAC manager logic 503 may be implemented as software or firmware (or a combination of software and firmware) executing on one or more processors, or using an ASIC (application-specific-integrated-circuit), DSP (digital signal processors), hard-wired circuitry (logic circuitry), state machines, an FPGA (field programmable gate array) or combinations thereof. Therefore, the example apparatus 500 illustrated in FIG. 5 and described herein provides an example embodiment and is not to be construed as a limitation on the various other possible implementations that may be used in accordance with the various embodiments.

More particularly, in some embodiments the MAC manager logic 503 shown in FIG. 5 may be an ASIC or FPGA operatively coupled to the first and second MAC devices by an S-Link™ interface or some other appropriate chip-to-chip communication interface. In another example embodiment, the MAC manager logic 503 may be implemented together with one, or more, MAC devices compliant with IEEE 802 wireless standards in an SoC (system on a chip) configuration. In another example embodiment, the MAC manager logic 503 may be implemented in a MAC device stackup as in a package-on-package (PoP) configuration. Further in some embodiments, the MAC manager logic 503 may be a removable and replaceable mobile device component that includes only the MAC manager logic, or that is a SoC component that includes one MAC manager logic components and one, or more, MAC devices for IEEE 802 wireless operation and operative to communicate with additional external IEEE 802 MAC devices. These example embodiments and other embodiments are contemplated by the present disclosure.

Figure 6:
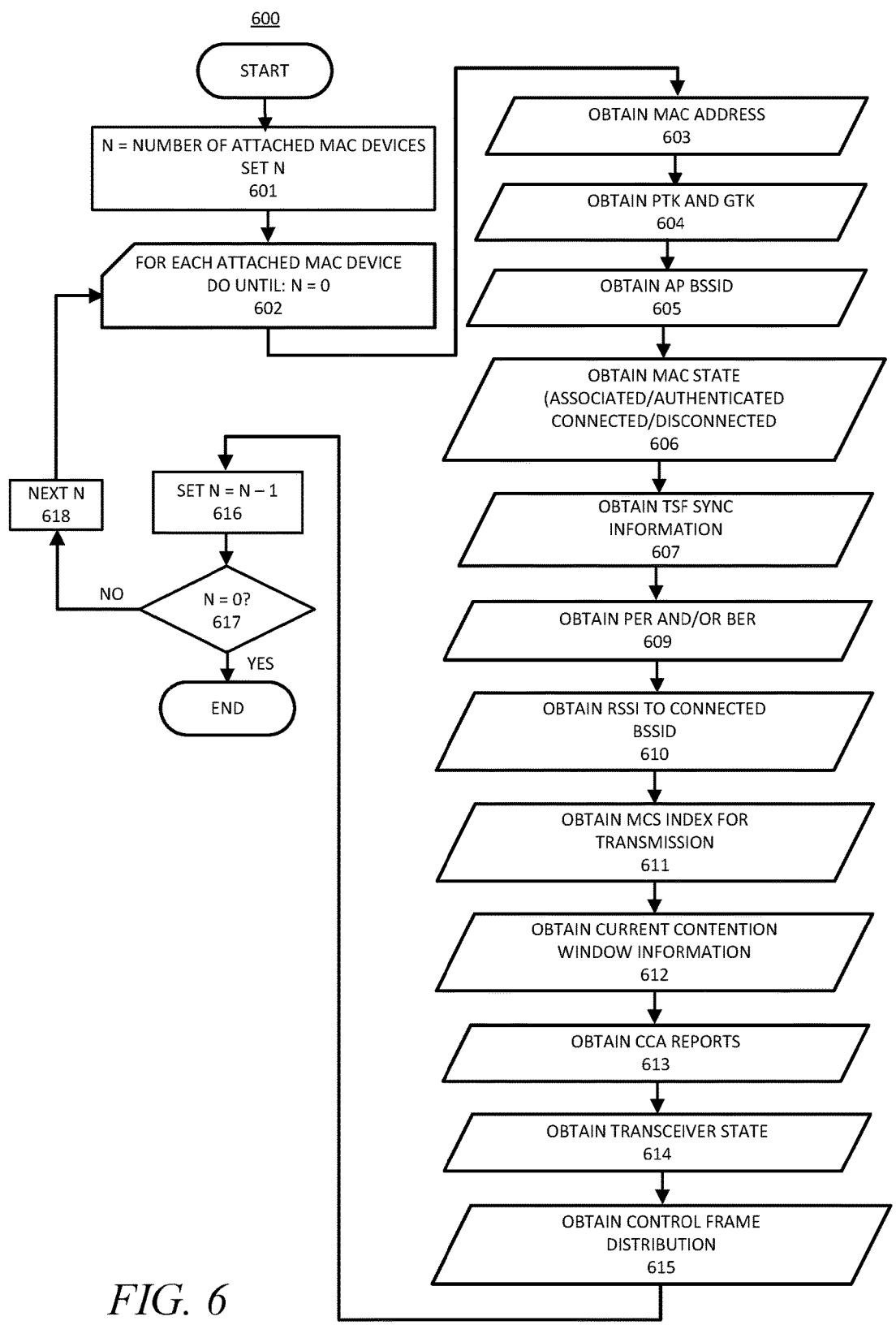
FIG. 6 is a flowchart showing an example data collection operation in accordance with various embodiments.
Figure 7:
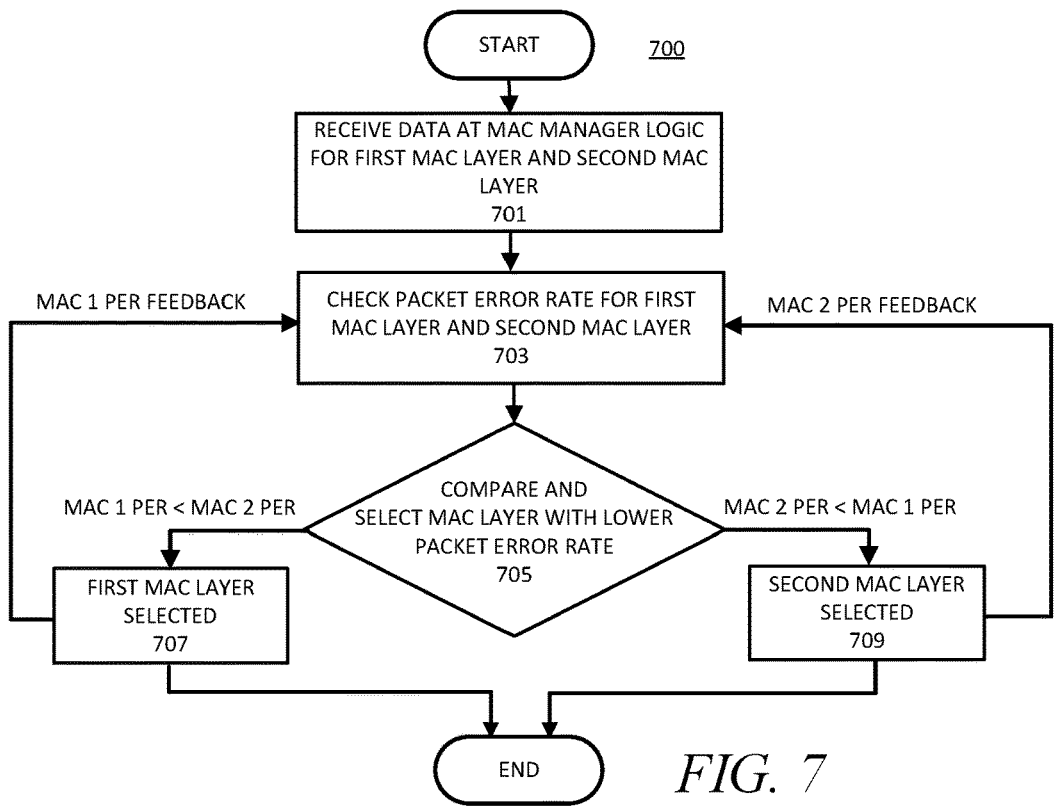
FIG. 7 is a flowchart showing an example radio selection procedure operation in accordance with various embodiments.

Examples of the radio selection procedures utilized by the MAC manager logic are illustrated in FIG. 6 and FIG. 7. FIG. 6 is a flowchart showing an example data collection operation 600 in accordance with various embodiments. The data collection operation 600 shown in FIG. 6 is applicable for any number of radio transmitters and any number of MAC layers. Although the examples provided in the present disclosure are limited to two radio transmitters and two MAC layers for purposes of explanation, it is to be understood that the present disclosure is applicable to systems having any number of radios transmitters and MAC layers. In operation block 601, the MAC manager logic begins data collection operation 600 for any number of attached MAC devices. For each MAC device in operation block 602, the MAC manager logic obtains: the MAC address 603, the PGK and GTK 604; the AP BSSID 605; the MAC state (associated/authenticated/connected/disconnected) 606; TSF sync information 607; PER and/or BER 609; RSSI to a connected BSSID 610; MCS index for transmission 611; current contention window information 612; CCA reports 613; transceiver state 614; and control frame distribution 615. In operation block 616, the MAC manager logic increments the index counter for the looping operation and if the index does not equal zero in decision block 617, then in operation block 618 the MAC manager logic obtains data for the next MAC address. When data has been collected for all MAC addresses in decision block 617, then the method of operation terminates as shown. It is to be understood that although the data collection operation 600 is shown as a looping operation for purpose of explanation, the data may be collected dynamically and in parallel for each MAC address in various embodiments and is not limited to collecting data in any particular order or for any particular number of MAC addresses. In other words, the data collection operation 600 may be performed in parallel for all MAC addresses and specific items of information may be collected in any particular order or in parallel. The data collection operation 600 may be triggered based on various operational conditions. For example, the data collection operation 600 may be invoked when any of the WLAN subsystem radios detect a change in any parameter, such as, but not limited to, PTK/GTK, PER, BER, RSSI, MCD IDX, CW, CCA, DIFS. A threshold value for any of these parameters may be set, that invokes the MAC manager logic to run the data collection operation 600. The data collection operation 600 may also be invoked upon detection of dynamic addition of a new radio (i.e. a new WLAN subsystem) by either the MAC manager logic or by an application layer system. Also, if the MAC manager logic does not receive a delta report from any of the WLAN subsystem radios for some preset period of time, of if one of the WLAN subsystem radios has a state change (i.e. connected, disconnected, associated, roaming), then the data collection operation 600 may be invoked so that the MAC manager logic can reevaluate the radio conditions and make selections accordingly.

FIG. 7 is a flowchart showing an example radio selection procedure 700 operation in accordance with some embodiments. In operation block 701, the MAC manager logic receives data for the first MAC layer and the second MAC layer. In operation block 703, the MAC manager logic checks the PER for the first MAC layer and the second MAC layer. In decision block 705, the MAC manager logic compares the PER values and selects the MAC layer having the lower PER. If the first MAC layer PER is less than the second MAC layer PER then, in operation block 707, the first MAC layer is selected. If the second MAC layer PER is less than the first MAC layer PER then, in operation block 709, the second MAC layer is selected. After selection of the MAC layer the method of operation terminates as shown. The first MAC layer and the second MAC layer provide feedback to operation block 703 and the operation in decision block 705 may select a different MAC layer at various times upon changed conditions determined by the MAC layer PER feedback.

Figure 8:
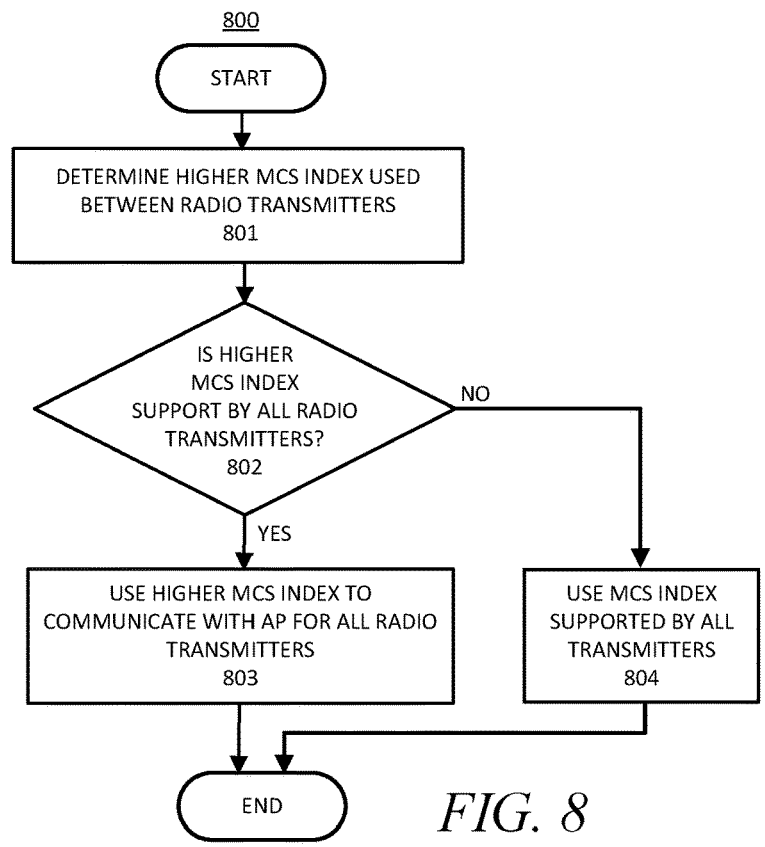
FIG. 8 is a flowchart showing an example MCS (modulation and coding scheme) selection procedure in accordance with an embodiment.

FIG. 8 is a flowchart showing an example MCS (modulation and coding scheme) selection procedure 800 in accordance with an embodiment. In operation block 801, the MAC manager logic determines the higher MCS index used between the various radio transmitters. In decision block 802, the MAC manager logic determines if the higher MCS index is supported by all the radio transmitters. If not then, in operation block 804, the MAC manager logic will select an MCS index that is supported by all transmitters and the method of operation will terminate as shown. However in decision block 802, if the higher MCS index is supported by all radio transmitters then, in operation block 803, the MAC manager logic will use the higher MCS index to communicate with the AP and this will be used by all radio transmitters. The method of operation then terminates as shown.

Figure 9:
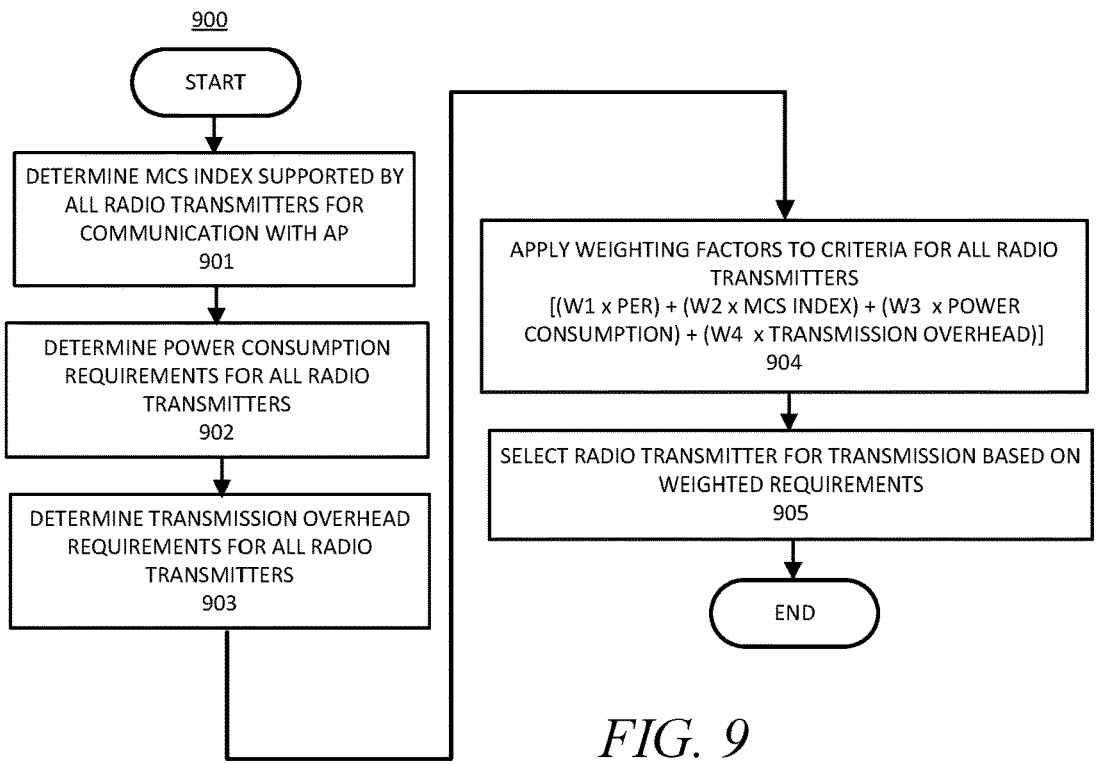
FIG. 9 is a flowchart showing an example radio selection procedure in accordance with an embodiment.

FIG. 9 is a flowchart showing an example radio selection procedure 900 in accordance with an embodiment. In the radio selection procedure 900, in operation block 901, the MAC manager logic determines the MCS index supported by all radio transmitters for communication with the AP. In operation block 902, the MAC manager logic determines power consumption requirements for all radio transmitters. In operation block 903, the MAC manager logic determines the transmission overhead requirements for all radio transmitters. In operation block 904, the MAC manager logic applies weighting factors to the criteria for each radio transmitter such that an overall evaluation value can be determined for each radio transmitter and such that the radio transmitters can be compared to one another to select the radio transmitter having the highest weighting. Therefore in operation block 905, the MAC manager logic selects the radio transmitter for transmission based on the weighted requirements and the radio selection procedure 900 terminates as shown.

The disclosed MAC manager logic therefore is operative to multiplex and/or collate MAC layer traffic and to switch between two or more MAC devices to control which MAC device/radio transmitter is actively transmitting data. As has been described above, these operations can be done both in the case of NAV reservation using RTS/CTS as well as in direct DCF based access (i.e. non RTS/CTS based). The operations disclosed illustrate that having a single MAC layer request for the duration of data from both MAC devices put together does away with mandatory inter-frame spacing wait times required when multiple independent MAC devices attempt to transmit. The disclosed embodiments therefore provide improved system efficiency when a single device such as a mobile phone, laptop computer, tablet, etc. has multiple MAC device/WLAN subsystems.

Returning to FIG. 2, the MAC manager logic 220 dynamically takes control of independent MAC layers for the first MAC device 202 and the second MAC device 203. The apparatus 201 can therefore use the same IP address when the multiple MAC devices are in communication through the same ESS 210 to a common entity 212 (which may be a server, another MAC device, etc.). More particularly, application data 251 from processor 250 is configured into IP packets in an IP queue 230 which may be channeled through the two different WLAN APs, in which each AP connection may be negotiated to two different capabilities depending on the MAC device used. The MAC manager logic 220 determines whether a single IP address may be used by determining whether the MAC devices are connected to a common ESS such as ESS 210. In one embodiment in which IPv4 is being used, the MAC manager logic 220 makes use of Address Resolution Protocol (ARP) to help make this determination. In embodiments in which IPv6 is being used, the MAC manager logic 220 makes use of Neighbor Discovery Protocol (NDP).

The ARP is a protocol for mapping an IP address to a physical machine address that is recognized in the local network. A table, usually called the ARP cache, is used to maintain a correlation between each MAC address and its corresponding IP address. ARP provides the protocol rules for making this correlation and providing address conversion in both directions. For example, when an incoming packet destined for a host machine on a particular local area network arrives at a gateway, the gateway uses ARP to find a physical host or MAC address that matches the IP address. The ARP program looks in the ARP cache and, if it finds the address, provides it so that the packet can be converted to the right packet length and format and sent to the machine.

However, if no entry is found in the ARP cache for the IP address, ARP broadcasts a request packet in a special format to all the machines on the LAN to see if one machine knows that it is associated with that IP address. A machine that recognizes the IP address will return a reply. ARP then proceeds to update the ARP cache for future reference and sends the packet to the MAC address corresponding to the machine that replied to the broadcast request packet.

In embodiments utilizing IPv6, Neighbor Discovery Protocol (NDP) may be used. In IPv6, the NDP protocol performs functions that are similar to those addressed by the Address Resolution Protocol (ARP) and Internet Control Message Protocol (ICMP), as well as Router Discovery and Router Redirect protocols used in IPv4. In NDP, the features of address resolution and redirect, which in IPv4 are under specific protocols (i.e. ARP and ICMP Redirect, respectively) are integrated features of NDP. The NDP Protocol makes use of ICMPv6 messages and solicited node multicast addresses for operating its core function, which is tracking and discovering other IPv6 hosts that are present on the other side of connected interfaces. Another use of NDP is address autoconfiguration. For address resolution, NDP defines a neighbor solicitation (NS) message and a neighbor advertisement (NA) message which is sent is response to an NS message.

Figure 10:
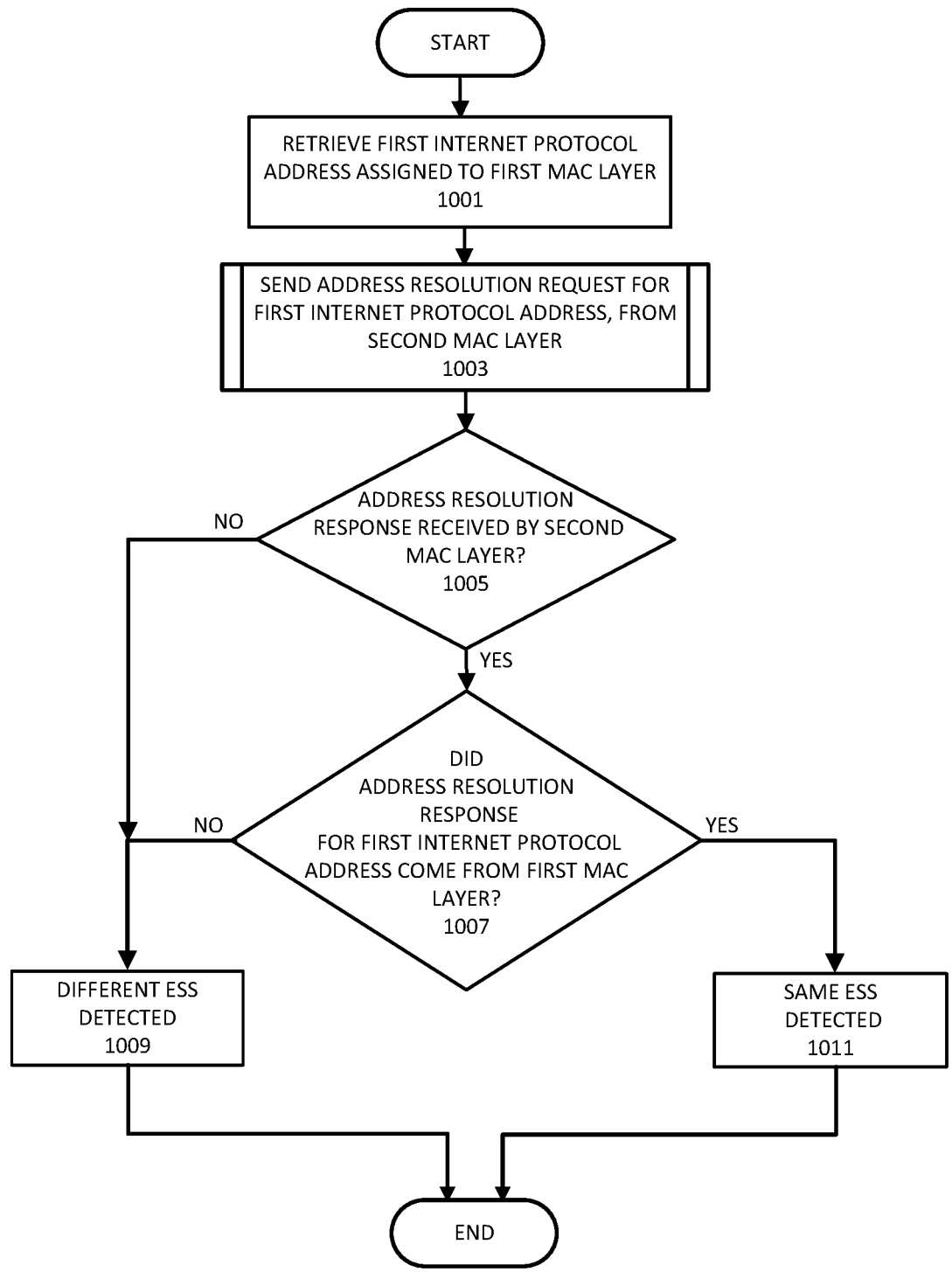
FIG. 10 is a flowchart showing an example procedure for determining if two radios are communicating with access points (APs) within the same ESS (Extended Service Set) in accordance with an embodiment.

The flowchart of FIG. 10 provides a method for determining whether the two MAC devices are communicating with APs within a common ESS. The method is used after each of the two MAC devices establishes a connection with a different AP, and therefore a different BSSID, as illustrated in the example of FIG. 2. At that time, the method of FIG. 10 is used to determine if the two APs are within the same ESS. If the APs are in the same ESS, then a single IP address can be used by both MAC devices. The method makes use of address resolution capabilities of the specific IP version in use. The method of operation begins and, in operation block 1001, the MAC manager logic 220 retrieves the first IP address assigned to the first MAC layer (i.e. the IP address corresponding to the first MAC device 202). In operation block 1003, the MAC manager logic 220 utilizes the address resolution protocol corresponding to the IP version in use. For example if IPv4 is used, then the MAC manager logic 220 will send an ARP request message. However if IPv6 is used, then the MAC manager logic 220 will send an NS message in accordance with NDP. The address resolution message is sent from the second MAC layer, that is, from the second MAC device 203.

In decision block 1005, the MAC manager logic 220 determines if an address resolution response (i.e. ARP response in IPv4 or NA message in IPv6) is received by the second MAC layer. If not, then in operation block 1009 a determination is made that the two APs are each on a different ESS, and the method of operation terminates. A timer feature is used to terminate the method if a response is not received within the timer period. If an address resolution response is received by the second MAC layer in decision block 1005, then the method of operation proceeds to decision block 1007. In decision block 1007, the MAC manager logic 220 determines if the address resolution response came from the first MAC layer. If not, then the ESS for the second AP is different from the first AP as shown in operation block 1009, and the method of operation terminates. However if the address resolution response did come from the first MAC layer in decision block 1007, then that indicates in operation block 1011 that both APs are within the same ESS. The method of operation then terminates, and the two MAC devices may use the same IP address.

Figure 11:
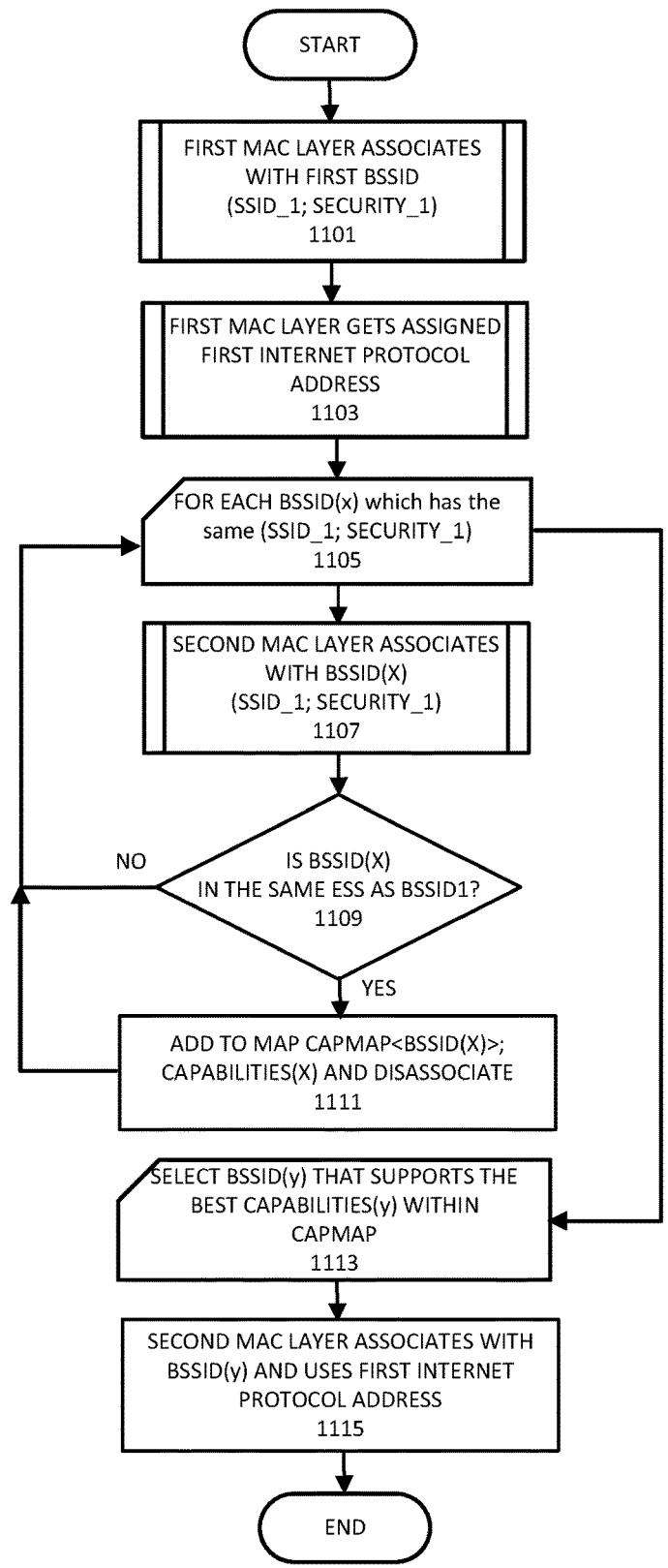
FIG. 11 is a flowchart showing an example procedure for maintaining multiple radio associations with a common ESS using a single IP address in accordance with an embodiment.

At that point, one of the other MAC devices may begin to communicate with the entity 212 using the $1^{st}$ IP address. The flowchart of FIG. 11 provides a method for determining the best AP for the idling MAC device to use while the other MAC device radio transmitter is busy. The method of operation begins and in operation block 1101, the first MAC device 202 associates with the first AP 204 using it BSSID. In operation block 1103, the first MAC device 202 is assigned the first IP address. The second MAC device 203 may then begin a looping operation beginning in operation block 1105 and check each AP in the ESS. In operation block 1107, the second MAC device 203 will being to associate with each AP having the same SSID and security as the first AP associated with the first MAC device 202. In other words, the second MAC device 203 begins an operation that maps out the APs within the ESS. In decision block 1109, if an AP is not found to be within the same ESS, then the method of operation returns to operation block 1105 and looks for another AP. If the AP is found to be within the same ESS in decision block 1109, then in operation block 1111 the AP is added to the ESS map and the second MAC device 203 disassociates with the AP and returns to operation block 1105 to look for another AP. After all visible APs are identified and added to the map, the method of operation proceeds to operation block 1113. In operation block 1113, the MAC manager logic 220 may utilize any or all of the methods of FIGS. 6, 7, 8 and/or 9 to determine the AP having the most suitable capabilities for data transmission. In operation block 1115, the second MAC device 203 associates with the AP identified in operation block 1113 and communicates using the first IP address under control of the MAC manager logic 220.

Thus the disclosed apparatus, system and methods of operation provide for use of the same IP address multiple MACs once it is identified that they belong to the same ESS. The disclosed methods of operation make use of address resolution messaging to determine if APs are within a common ESS for the purpose of using a single IP address. The disclosed methods of operation also provide for selection of an AP based on, among other things, MAC capabilities such as the supported data rates, RF congestion (channel and co-channel), etc. The disclosed methods of operation thus enable agnosticity to layer 3 and above by maintaining a single network IP queue for application data and configuring individual MACs to service (transmit) data packets as available, thereby achieving minimal fragmentation at the source.

While various embodiments have been illustrated and described, it is to be understood that the invention is not so limited. Numerous modifications, changes, variations, substitutions and equivalents will occur to those skilled in the art without departing from the scope of the present invention as defined by the appended claims.

What is claimed is:

1. An apparatus comprising:
   a first media access control (MAC) device comprising a first radio transceiver and having a first MAC address, the first MAC device operative to communicate with a first wireless access point using an Internet Protocol (IP) address;
   a second MAC device comprising a second radio transceiver and having a second MAC address, the second MAC device operatively coupled to the first MAC device, the second MAC device operative to communicate with a second wireless access point using the same IP address; and
   MAC manager logic, operatively coupled to the first MAC device and to the second MAC device, the MAC manager logic operative to determine that the first wireless access point and the second wireless access point are in a common ESS (Extended Service Set).

2. The apparatus of claim 1, wherein the MAC manager logic is further operative to control the first MAC device and the second MAC device to use the same IP address in response to determining that the first wireless access point and the second wireless access point are in a common ESS.

3. The apparatus of claim 1, further comprising:
   a processor, operatively coupled to the MAC manager logic, the processor operative to maintain a network data queue; and
   wherein the MAC manager logic is further operative to allocate data from the network data queue to the first MAC device and the second MAC device to coordinate communication with the first access point and the second access point using the same IP address.

4. The apparatus of claim 1, wherein the MAC manager logic is further operative to determine that the first wireless access point and the second wireless access point are in a common ESS using an address resolution request.

5. The apparatus of claim 4, wherein the MAC manager logic is further operative to:
   control the second MAC device to send the address resolution request to the second wireless access point for an IP address assigned to the first MAC device; and
   determine that the first wireless access point and the second access point are in the same ESS in response to an address resolution request response being received by the first MAC device.

6. The apparatus of claim 5, wherein the MAC manager logic is further operative to:
   determine that the first wireless access point and the second access point are in a different ESS in response to an address resolution response for the IP address assigned to the first MAC device being received by the second MAC device; and
   search for a third wireless access point within the same ESS as the first wireless access point.

7. The apparatus of claim 1, wherein the MAC manager logic is further operative to:

determine a set of wireless access points within a common ESS using the first MAC device and the second MAC device; and select a first wireless access point for association with the first MAC device and a second wireless access point for association with the second MAC device based on at least one of supported data rate or congestion criteria for each of the wireless access points.

8. The apparatus of claim 1, wherein the MAC manager logic is an application specific integrated circuit (ASIC).

9. The apparatus of claim 1, wherein the MAC manager logic comprises a field programmable gate array (FPGA).

10. A method comprising:

determining that a first wireless access point and a second wireless access point are in a common ESS (Extended Service Set);

associating a first media access control (MAC) device having a first MAC address with the first wireless access point and obtaining an Internet Protocol (IP) address; and associating a second MAC device having a second MAC address with the second wireless access point using the same IP address in response to determining that the first wireless access point and the second wireless access point are in the same ESS.

11. The method of claim 10, further comprising:

allocating data from a single network data queue to the first MAC device and the second MAC device to coordinate communication with the first wireless access point and the second wireless access point using the same IP address.

12. The method of claim 10, further comprising:

determining that the first wireless access point and the second wireless access point are in a common ESS using an address resolution request.

13. The method of claim 12, further comprising:

controlling the second MAC device to send the address resolution request to the second wireless access point for an IP address assigned to the first MAC device; and determining that the first wireless access point and the second access point are in the same ESS in response to an address resolution request response being received by the first MAC device.

14. The method of claim 13, further comprising:

determining that the first wireless access point and the second access point are in a different ESS in response to an address resolution response for the IP address assigned to the first MAC device being received by the second MAC device; and searching for a third wireless access point within the same ESS as the first wireless access point.

15. The method of claim 10, further comprising:

determining a set of wireless access points within a common ESS using the first MAC device and the second MAC device; and selecting a first wireless access point for association with the first MAC device and a second wireless access point for association with the second MAC device based on at least one of supported data rate or congestion criteria for each of the wireless access points.

* * * * *